US009735686B2

(12) United States Patent
Adragna et al.

(10) Patent No.: US 9,735,686 B2
(45) Date of Patent: *Aug. 15, 2017

(54) DEVICE FOR AVOIDING HARD SWITCHING IN RESONANT CONVERTER AND RELATED METHOD

(71) Applicant: STMicroelectronics S.r.l., Agrate Brianza (IT)

(72) Inventors: Claudio Adragna, Monza (IT); Aldo Vittorio Novelli, San Lorenzo di Parabiago (IT); Christian Leone Santoro, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,570

(22) Filed: Sep. 21, 2015

(65) Prior Publication Data

US 2016/0013722 A1    Jan. 14, 2016

Related U.S. Application Data

(63) Continuation of application No. 13/416,656, filed on Mar. 9, 2012, now Pat. No. 9,143,046.

(30) Foreign Application Priority Data

Mar. 11, 2011    (IT) .................................. MI11A0388

(51) Int. Cl.
*H02M 3/335*    (2006.01)
*H02M 3/337*    (2006.01)
*H02M 1/00*    (2006.01)

(52) U.S. Cl.
CPC ..... *H02M 3/33507* (2013.01); *H02M 3/3376* (2013.01); *H02M 2001/0058* (2013.01); *Y02B 70/1433* (2013.01); *Y02B 70/1491* (2013.01)

(58) Field of Classification Search
None
See application file for complete search history.

(56) References Cited

U.S. PATENT DOCUMENTS

| 6,154,375 | A  | 11/2000 | Majid et al. |
| 7,315,460 | B2 | 1/2008  | Kyono |
| 7,482,791 | B2 | 1/2009  | Stoichita et al. |
| 7,773,398 | B2 | 8/2010  | Kyono |

(Continued)

*Primary Examiner* — Jeffrey Gblende
(74) *Attorney, Agent, or Firm* — Seed IP Law Group LLP

(57) ABSTRACT

A control device controls a switching circuit for a converter. The switching circuit comprises a half-bridge having a high-side transistor and a low-side transistor. The control device comprises a controller configured to control turning on and turning off said two transistors, so that a square-wave voltage is applied to the transformer primary. The controller is configured to start switching the half-bridge by turning on the low-side transistor. The control device comprises a first timer configure to initially turn on the low-side transistor for a duration given by a first time period useful for precharging a bootstrap capacitor couplable to the middle point of the half-bridge, and a second timer configured to keep the low-side transistor and the high-side transistor turned off for a second time period immediately following the first time period and having a longer duration than the first time period.

19 Claims, 6 Drawing Sheets

(56) References Cited

U.S. PATENT DOCUMENTS

| | | |
|---|---|---|
| 7,965,522 B1 | 6/2011 | Hornberger et al. |
| 8,339,817 B2 | 12/2012 | Halberstadt |
| 8,824,182 B2 | 9/2014 | Eom et al. |
| 2007/0096662 A1 | 5/2007 | Ribarich et al. |
| 2007/0126497 A1 | 6/2007 | Palaniappan et al. |
| 2008/0129269 A1 | 6/2008 | Rozsypal et al. |
| 2008/0218141 A1 | 9/2008 | Lu et al. |
| 2010/0134091 A1 | 6/2010 | Eom et al. |
| 2010/0226050 A1 | 9/2010 | Koo et al. |
| 2010/0259238 A1* | 10/2010 | Cheng ............... H02M 1/36 323/282 |
| 2011/0018613 A1* | 1/2011 | Wang ............... H02M 3/1588 327/530 |
| 2011/0156669 A1* | 6/2011 | Ishii ............... H02M 3/1588 323/271 |

* cited by examiner

DEVICE FOR AVOIDING HARD SWITCHING IN RESONANT CONVERTER AND RELATED METHOD

BACKGROUND

Technical Field

The present disclosure relates to a device for avoiding hard switching of converters, in particular in resonant converters, and a related method.

Description of the Related Art

Resonant converters are known in the state of the art, using half-bridge or full-bridge circuit topologies. In the case of a half-bridge resonant converter, the switching elements comprise a high-side transistor and a low-side transistor connected in series between an input voltage and ground. A square wave having a high value corresponding to the input voltage and a low value corresponding to ground may be generated by conveniently switching the two transistors. A small time interval Td called "dead time", during which the transistors are turned off, is typically added immediately after each of them is turned off.

In resonant converters, the square wave generated by the half-bridge is applied to the primary winding of a transformer by a resonant network which comprises at least one capacitor and one inductor; the secondary winding of the transformer is connected with a rectifier circuit and a filter to provide a DC output voltage. The value of the output voltage depends on the frequency of the square wave.

The so-called LLC resonant converter is often used among the several types of resonant converters, especially the half-bridge LLC resonant convertor. The LLC designation comes from the resonant circuit employing two inductors (L) and a capacitor (C) and a schematic circuit of an LLC resonant converter is shown in FIG. 1. The resonant converter 1 comprises a half-bridge of transistors Q1 and Q2, with respective body diodes Db1 and Db2, between the input voltage Vin and ground GND and driven by a driver circuit 3 by means of the signals HSGD and LSGD. The common terminal HB between transistors Q1 and Q2 is connected to a resonant circuit 2 comprising a series of a capacitor Cr, an inductance Ls, and a parallel circuit that includes another inductance Lp connected in parallel to a primary of a transformer 10 with a center-tap secondary. The two windings of the center-tap secondary of transformer 10 are connected to the anodes of two diodes D1 and D2, the cathodes of which are both connected to the parallel of a capacitor Cout and a resistance Rout. The output voltage Vout of the resonant converter is the voltage across said parallel, while the output current Iout flows through the resistance Rout.

Resonant converters offer considerable advantages as compared to traditional switching converters (non-resonant, typically PWM-controlled (Pulse Width Modulation)): waveforms without steep edges, low switching losses in the power switches due to "soft" switching thereof, high conversion efficiency (>95% is easily reachable), ability to operate at high frequencies, low EMI (electro-magnetic interference) generation and, finally, high power density (i.e., enabling to build conversion systems capable of handling considerable powers levels in a relatively small space).

However, the same resonant converters are affected by certain disadvantages during the start-up step. In said step, when the high-side transistor Q1 is turned on the first time, the voltage seen by the primary winding is substantially equal to the power supply voltage. In the successive semi-period of the square wave, when the low-side transistor Q2 is turned on, the voltage seen by the primary winding is substantially equal to the voltage across the capacitor Cr; therefore, the current flowing through the resonant network increases more quickly during the turning on of the high-side transistor, while decreases less quickly during the turning on of the low-side transistor. Thereby, when the low-side transistor is turned off again, the current flows through the body diode Db2 thereof. When the high-side transistor is turned on again, a reverse voltage is developed across the body diode Db2 of the low-side transistor, while the diode Db2 is still conducting. Under said conditions, the high-side transistor is turned on under hard switching conditions and the diode Db2 is stressed in reverse recovery. Therefore, both the high-side transistor and the low-side transistor are conductive in the same time period by short-circuiting the supply terminal with the ground terminal until the body diode Db2 is recovered. Under such conditions, the voltage at the terminals of the transistor may vary so quickly that the intrinsic, parasitic bipolar transistor of the MOSFET transistor structure may be triggered, thus causing a shoot-through condition which may cause the destruction of the transistor in few microseconds.

In driving devices of high-voltage half-bridges, the power supply voltage of the driving section of the high-side MOSFET Q1 is typically obtained by means of a so-called bootstrap system, shown in FIG. 2. According to this method, the capacitor Cboot (bootstrap capacitor), is coupled with the middle point HB of the half-bridge and acts as power buffer to supply the driver 31, i.e., the part of driver 3 which drives the high-side transistor Q1. The capacitor Cboot is charged by a low-voltage generator Vcc through a high-voltage diode Dboot (bootstrap diode) with a voltage Vboot when the middle point HB of the half-bridge is at a low voltage level (that is, when the low-side transistor Q2 is turned on). When the high-side MOSFET Q1 is turned on and the middle point HB of the half-bridge is high, the diode Dboot isolates the capacitor Cboot from the low-voltage line.

Hence, to correctly drive the high-side MOSFET Q1 from the first turning-on cycle, the half-bridge is started by first turning on the low-side MOSFET Q2 so as to pre-charge the bootstrap capacitor Cboot.

In certain cases, the bootstrap diode Dboot may be provided by an integrated structure inside the driver device 3, as shown in FIG. 3. In this case, indeed, the component acting as the diode is a MOSFET transistor M, which is synchronously driven with the low-side MOSFET Q1, so as to obtain the above-mentioned functionality.

As compared to a real diode (one of ultrafast type would be used), the integrated bootstrap diode has a considerably higher resistance (of a hundred ohms as compared to hundreds of mohms of the ultrafast diode). Accordingly, while the charge of the bootstrap capacitor (which is of hundreds of nF) is almost instantaneous with the diode, longer times (of tens of µs) occur with the integrated diode.

For this reason, it is usual that the first turning on of the low-side MOSFET in the control devices of half-bridges converters with integrated bootstrap diodes is intentionally longer than the following ones during the first switching cycles.

During the pre-charging cycle of the bootstrap capacitor Cboot, having a duration Tpc, if the resonant capacitor Cr is initially charged (this always happens if the split capacitor configuration of Cr is used, shown in FIG. 4), the current Ir will circulate in the resonant circuit. Such a current is a sinusoidal wave at the resonant frequency $f_R = 1/T_R$ of the resonant circuit (Cr, Ls), the peak amplitude of which is equal to the voltage across Cr divided by the characteristic impedance of the resonant circuit itself.

If, at the end of the time period Tpc, the low-side MOSFET Q2 works in the third quadrant (i.e., the current passes from the source terminal to the drain terminal), the current will continue to flow through its body diode Db2, even after the MOSFET Q2 turns off. Therefore, after the dead time Td elapses, the high-side MOSFET Q1 is turned on while the body diode of Q2 is conducting, thus stressing the reversed recovery thereof. FIG. 5 shows the waveforms of the signals HSGD, LSGD, the half-bridge voltage VHB, the voltage Vcr at the terminals of capacitor Cr, the current Ir, the current IQ2 flowing through the transistor Q2, and the current Ilp which flows through the inductor Lp.

The low-side MOSFET Q2 will conduct into the third quadrant at the end of the pre-charging time Tpc if the condition $$\frac{K}{2} \times T_R < Tpc < \frac{K+1}{2} \times T_R$$

is met, where K is an odd integer.

Resonance frequency $f_R=1/T_R$ of the LLC circuit is typically selected based on other considerations, whereby restraining it to the time period Tpc is not generally acceptable.

BRIEF SUMMARY

A possible solution is that of modulating the time period Tpc so that the above-mentioned condition does not occur. This may be done by detecting the current which flows in the resonant circuit and terminating the time period Tpc by means of a zero comparator, when the resonant current is negative and thus is flowing between low-side drain and source. However, if the resonant capacitor Cr is initially drained, the currents which circulate during the time period Tpc are highly small and the zero comparator could never detect the current being negative due to the inevitable input offset thereof.

One embodiment of the present disclosure is a device for avoiding the hard switching in converters, in particular in resonant converters, which overcomes the aforesaid drawback.

One embodiment of the disclosure is a control device of a switching circuit of a converter, said switching circuit comprising at least one half-bridge having a high-side transistor and a low-side transistor and connected between an input voltage and a reference voltage. The converter includes a transformer with a primary coupled with the middle point of said half-bridge and a secondary coupled with a load. The control device includes a driver adapted to determine the turning on and turning off of said two transistors, so that a periodic, square-wave voltage is applied to the transformer primary. The driver is configured so that the start of the switching occurs when turning on the low-side transistor. The control device comprising a first timer adapted to set said initial turning on of the low-side transistor to have a duration given by a first time period useful for pre-charging a bootstrap capacitor couplable with the middle point of the half-bridge. The control device further comprises a second timer configured to keep the low-side transistor and the high-side transistor turned off over a second time period, immediately following the first time period and having a longer duration than the first time period.

BRIEF DESCRIPTION OF THE SEVERAL VIEWS OF THE DRAWINGS

The features and advantages of the present disclosure will become apparent from the following detailed description of practical embodiments thereof, shown by way of non-limiting examples in the accompanying drawings, in which.

DETAILED DESCRIPTION

Figure 1:
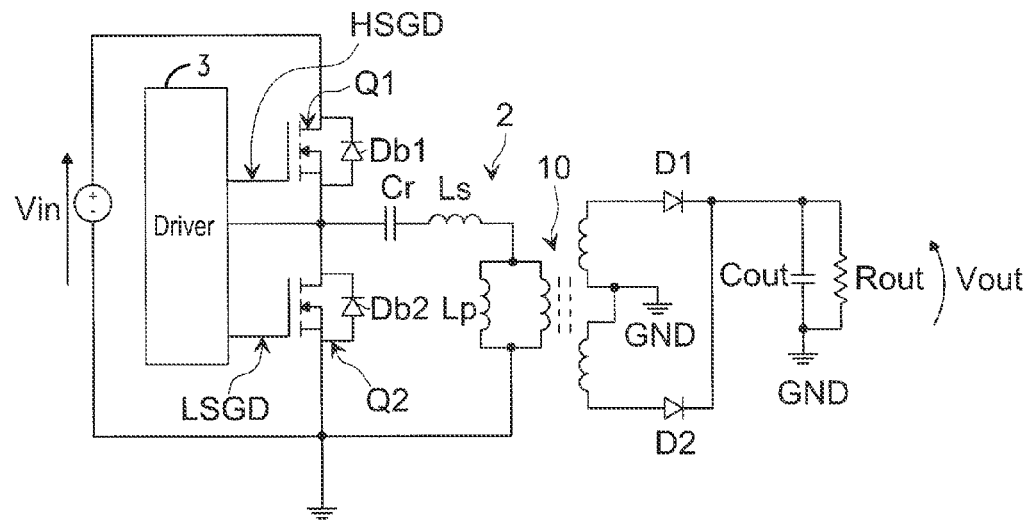
FIG. 1 is a circuit schematic of a resonant converter of LLC type in accordance with the known art.
Figure 2:
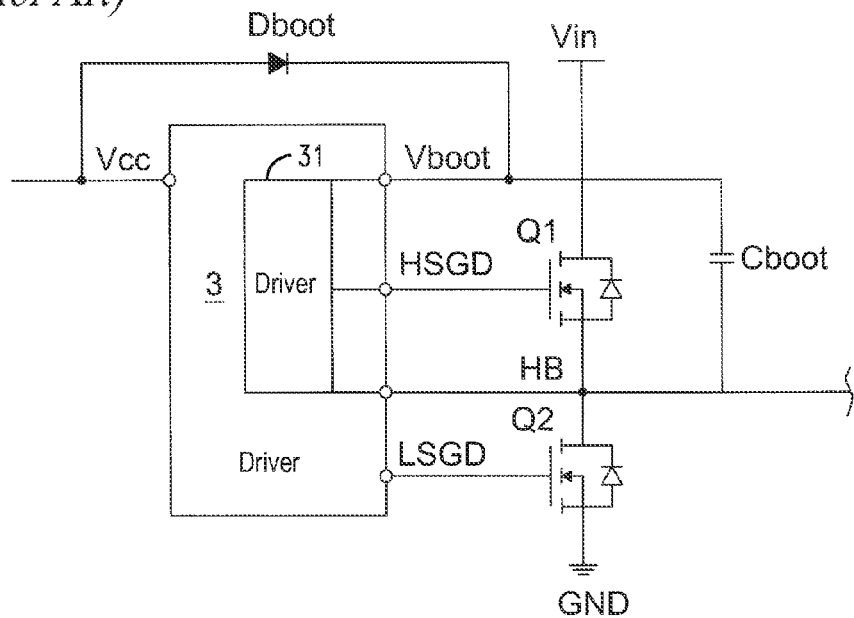
FIG. 2 is a circuit schematic of the driver of the half-bridge of the converter in FIG. 1 in accordance with the known art.
Figure 3:
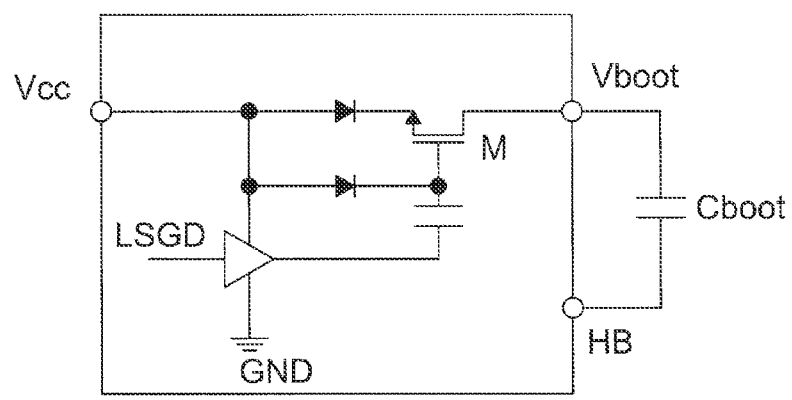
FIG. 3 is a circuit schematic of another possible implementation of the boost diode in accordance with the known art.
Figure 4:
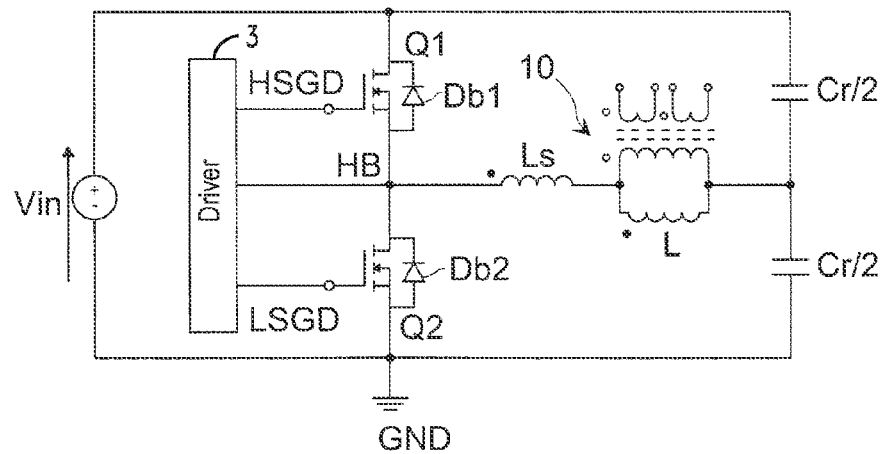
FIG. 4 corresponds to the circuit in FIG. 1 with split-capacitor configuration.
Figure 5:
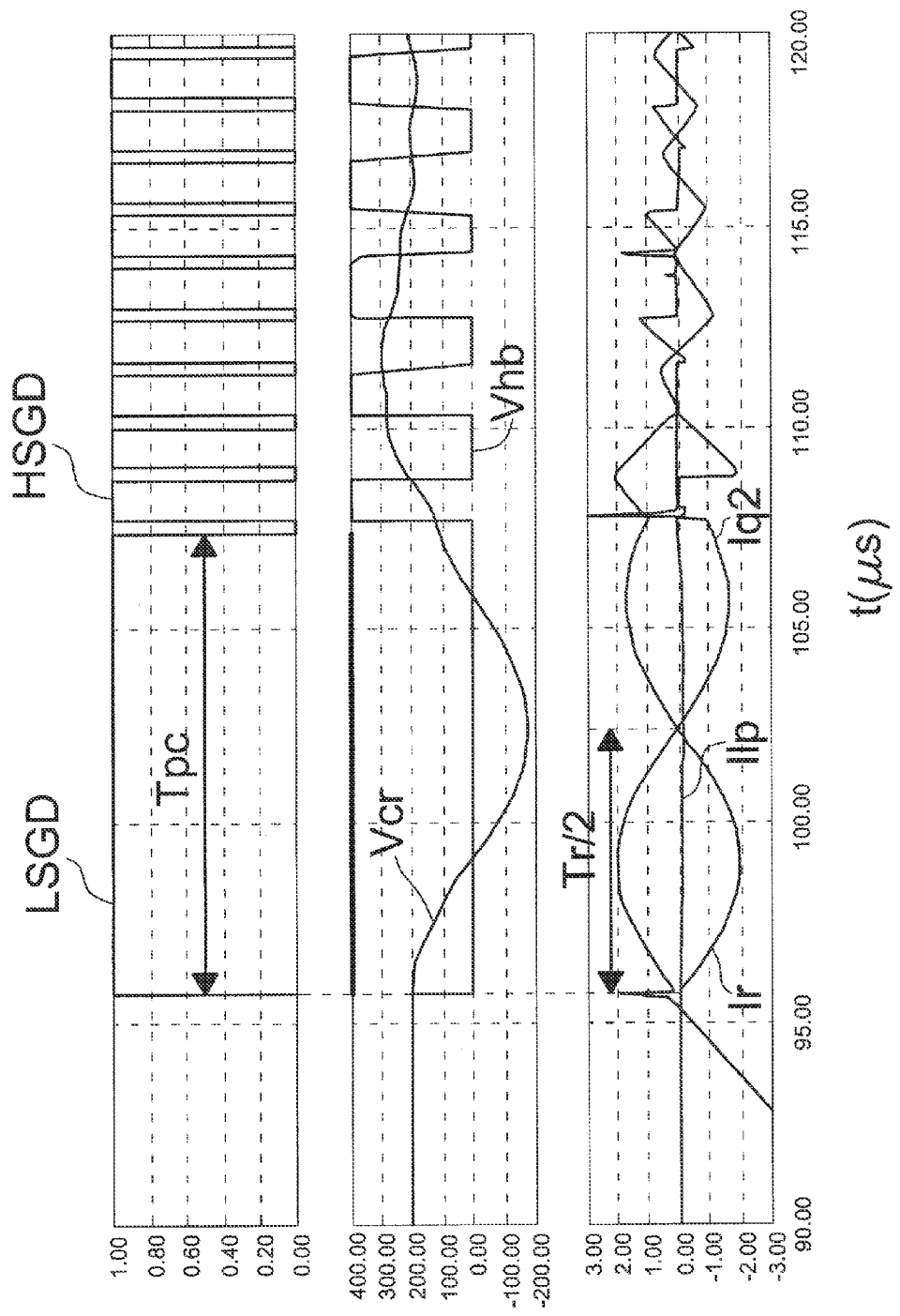
FIG. 5 shows time diagrams of certain voltages and currents involved in the circuit in FIG. 4 or in that in FIG. 1 if the voltage initially present at the terminals of capacitor Cr is not null.
Figure 6:
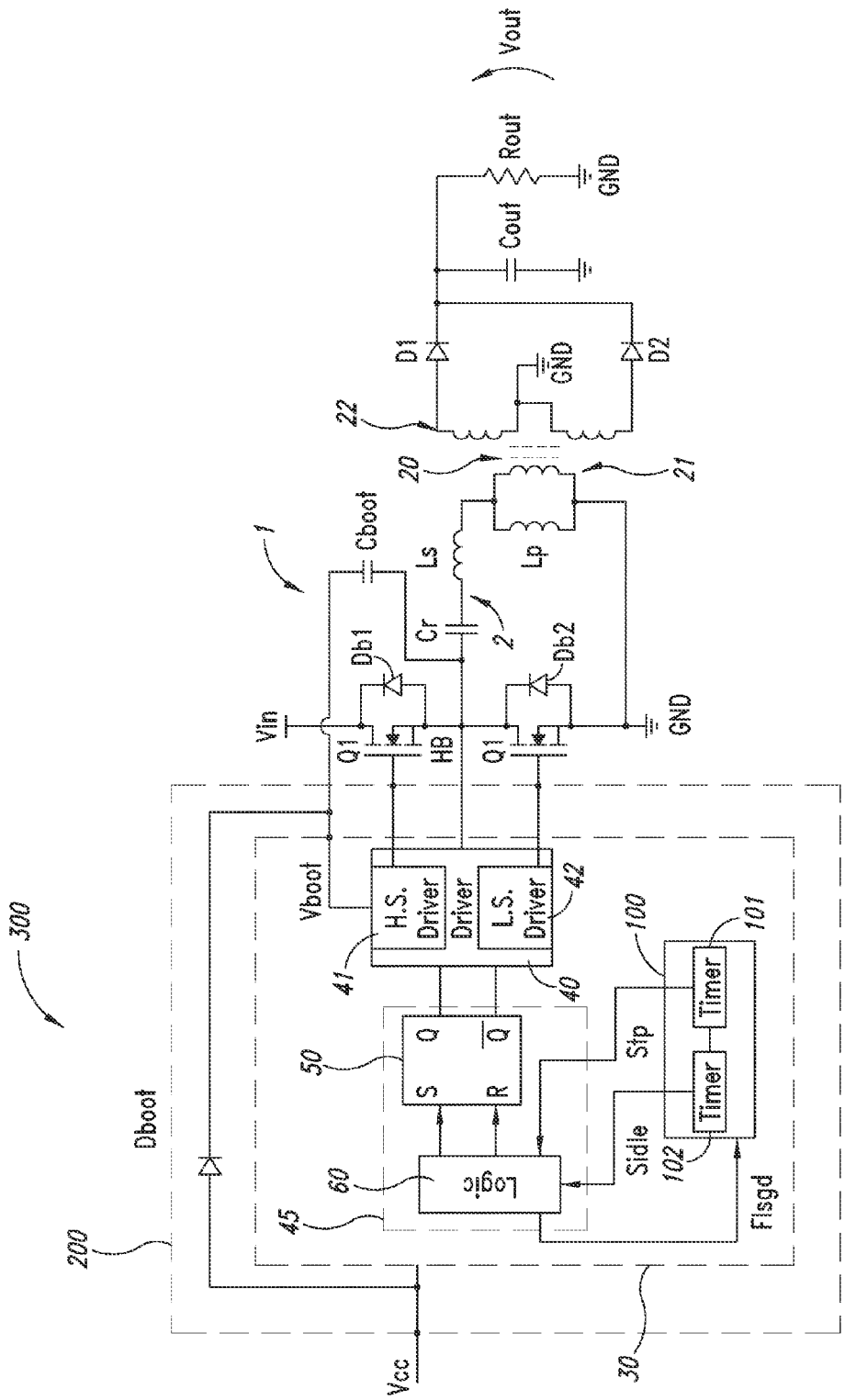
FIG. 6 is a circuit schematic of a LLC resonant converter with a driving circuit provided with a device to avoid the hard switching in resonant converters in accordance with the present disclosure.

FIG. 6 shows a control device 30 for a converter 1, in particular a resonant converter, in accordance with the present disclosure. The resonant converter 1, preferably a DC-DC converter, comprises a half-bridge of transistors Q1 and Q2, with respective body diodes Db1 and Db2, between the input voltage Vin and ground GND, and driven by the control circuit 30 by means of signals HSGD and LSGD. The common terminal HB between the transistors Q1 and Q2 is connected to a resonant circuit 2 comprising a series of a capacitor Cr, an inductance Ls and a parallel circuit that includes another inductance Lp connected in parallel to a transformer 20 having a primary 21 and a center-top secondary 22. The two windings of the center-top secondary of transformer 20 are connected to the anodes of two diodes D1 and D2, the cathodes of which are both connected to the parallel of a capacitor Cout and a resistance Rout. The output voltage Vout of the resonant converter is the voltage across said parallel, while the output current Iout flows through the resistance Rout.

There is a capacitor Cboot (connected to the terminal HB of the half-bridge), which acts as a power buffer to supply the control circuit 30, in particular for a high-side driver 41 of driver 40, the driver 41 being configured to drive the high-side transistor Q1. The capacitor Cboot is charged by a low-voltage generator Vcc through a high-voltage diode Dboot (bootstrap diode) with a voltage Vboot when the middle point HB of the half-bridge is at a low voltage level (that is, when the low-side transistor Q2 is turned on). When the high-side MOSFET Q1 is turned on and the middle point HB of the half-bridge is high, the diode Dboot isolates capacitor Cboot from the low-voltage line. The control device 30 is integrated in a semiconductor material chip 200 so as to provide an integrated circuit 300. The diode Dboot is preferably within the integrated circuit 300, and thus integrated with the control device 30 in the semiconductor material chip 200.

The control circuit 30 comprises the driving block 40 for driving transistors Q1 and Q2 and the driving block 40 is supplied by a controller 45 that includes a set-reset flip-flop 50 and a logic circuit 60. The controller 45 is able to cause the driving block 40 to send the driving signals of transistors Q1 and Q2 for on and turning off the transistors Q1 and Q2, so that a periodic square-wave voltage is applied to the primary 21 of the transformer. The square-wave voltage varies between a high voltage level, preferably corresponding to the input voltage Vin, and a low voltage level, preferably corresponding to ground GND. The driving block 40 comprises a high-side driver 41 and a low-side driver 42 for respectively driving the transistors Q1 and Q2 by means of the signals HSGD and LSGD, respectively. The controller 45 sets a short (some hundreds of nanoseconds) time period to elapse between the instant of turning off one of the transistors Q1, Q2 and the instant of turning on the other of the transistors Q1, Q2, which is called dead time Td in which both the transistors Q1 and Q2 are turned off. The controller 45 sets the turning on of the half-bridge Q1-Q2 to start when turning on the low-side transistor Q2.

The control circuit 30 also comprises a timer circuit 100 adapted to avoid the hard switching in the resonant converter 1. The timer circuit 100 comprises a first timer 101 adapted to set a pre-charging period Tpc for transistor Q2. In particular, the first timer circuit 101 sends a signal Stp to the logic circuit 60 of the controller 45 to set the first turning on of the low-side transistor Q2 to have a duration given by time period Tpc, i.e., a time period useful for pre-charging the capacitor Cboot. The time period Tpc is of the order of tens of microseconds and certainly greater than the dead time Td.

The timer circuit 100 also comprises a second timer 102 adapted to control the turning off of the low-side transistor Q2 and the high-side transistor Q1 over a time period Tidle following the time period Tpc. The second time period Tidle occurs between the final instant Tfinpc of the pre-charging period Tpc of capacitor Cboot and the starting instant Tin of the switching of the half-bridge which, for example, may coincide with the initial instant of turning on the high-side transistor Q1, or with the turning on of the low-side transistor Q2 again. The time period Tidle is to be longer than the time period Tpc. The time period Tidle is to be long enough that any possible current oscillations due to capacitor Cr firstly charged are reduced to no longer inject the body diodes Db1 and Db2 and short enough the bootstrap capacitor Cboot is not discharged to compromise the correct driving of the high-side transistor Q1. A possible value is Tidle≈5·Tpc, for example.

The second timer 102 thus sends a signal Sidle to the logic circuit 60 to set the turning off of low-side transistor Q2 and high-side transistor Q1 over a time period Tidle following the time period Tpc, i.e., between the final instant Tfinpc of the pre-charging period Tpc of capacitor Cboot and the starting instant Tin of the switchings of the half-bridge which, for example, may coincide with the initial instant of turning on the high-side transistor Q1, but also with the turning on of the low-side transistor Q2 again.

The logic circuitry 60 sends set and reset signals to S and R inputs respectively, of the flip-flop 50, the outputs Q and $\overline{Q}$ of which are at the input to the drivers 41, 42 of transistors Q1 and Q2. The signals Stp and Sidle are received at inputs of the control logic circuitry 60 to conveniently modify the set and reset signals that are output from the circuitry 60 and received at the S, R inputs of the flip-flop 50. The timers 101 and 102 are configured to operate with the logic circuitry 60 only at the initial step of the first switching cycle of the half-bridge; after the first switching cycle of the half-bridge, the timers 101 and 102 remain inactive.

Figure 7:
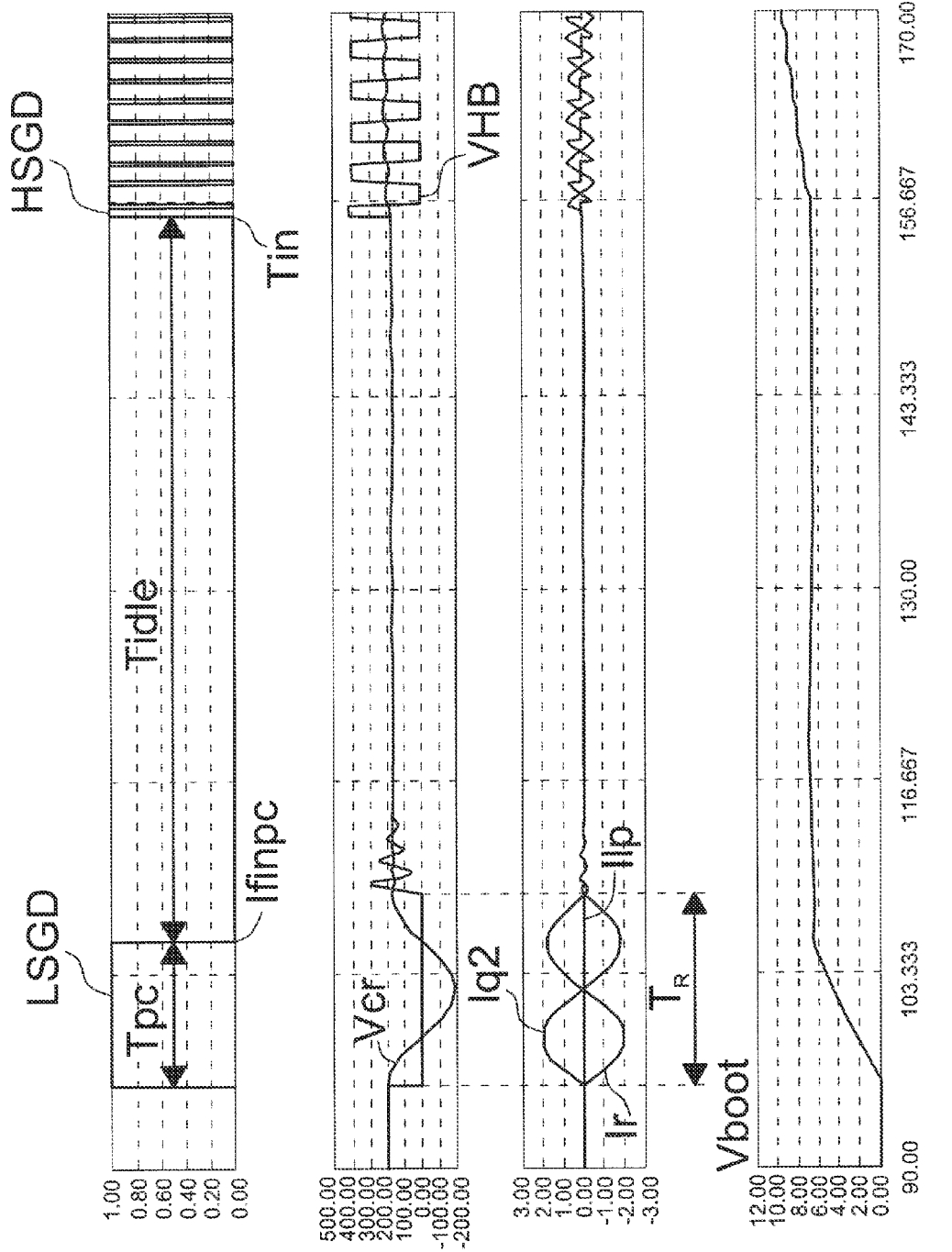
FIG. 7 shows time diagrams of certain voltages and currents involved in the circuit in FIG. 6.

FIG. 7 shows the waveforms of the signals HSGD, LSGD, the half-bridge voltage VHB, the voltage Vcr across the capacitor Cr, the current Ir, the current IQ2 flowing through the transistor Q2, the current Ilp flowing through in the inductor Lp, and the voltage Vboot across the capacitor Cboot for the converter in FIG. 6.

Figure 8:
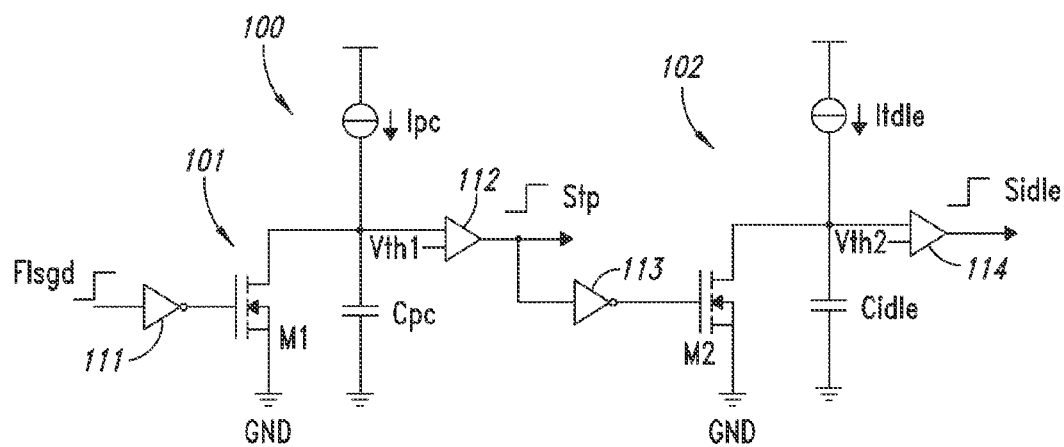
FIG. 8 shows a possible circuit implementation of the device for avoiding hard switching in the resonant converters in accordance with the present disclosure.

FIG. 8 shows a possible implementation of the timer circuit 100. In said implementation, the durations of the time periods Tpc and Tidle may be implemented by means of the time periods for charging the two different capacitors Cpc and Cidle. In the instant when the low-side transistor Q2 is turned on for the first time by means of the first impulse of signal LSGD, the logic circuit 60 provides a signal at high logic level, indicated by Flsgd, via a NOT gate 111, to a MOS transistor M1 having its drain terminal connected to a terminal of the capacitor Cpc (the other terminal of which is connected to ground GND) and its source terminal connected to ground GND. The MOS transistor M1 is off and therefore a current generator Ipc may charge the capacitor Cpc. A comparator 112 compares the voltage Vpc across the capacitor Cpc is compared with a first threshold voltage Vth1 and emits the input signal Stp to circuitry 60. The signal Stp, typically at low logic level, e.g., at ground GND, is brought to high logic level when Vcp=Vth1. The high logic level of signal Stp is applied by means of a NOT gate 113, to a MOS transistor M2 having its drain terminal connected to a terminal of capacitor Cidle (the other terminal of which is connected to ground GND) and the source terminal connected to ground GND. The transistor M2 is turned off and therefore a current generator Iidle may charge the capacitor Cidle. A comparator 114 compares the voltage Vidle across the capacitor Cidle with a threshold voltage Vth2 and outputs the signal Sidle to an input of the circuitry 60. The signal Sidle, typically at low logic level, e.g., at ground GND, is brought to high logic level when Vidle=Vth2 at the instant Tin. The time period Tidle is given by instant Tcpfin, when signal Stp is brought to the high logic level up to the starting instant Tin of the switchings of the half-bridge which, for example, may coincide with the initial instant of turning on the high-side transistor Q1, or with the turning on of the low-side transistor Q2 again.

Figure 9:
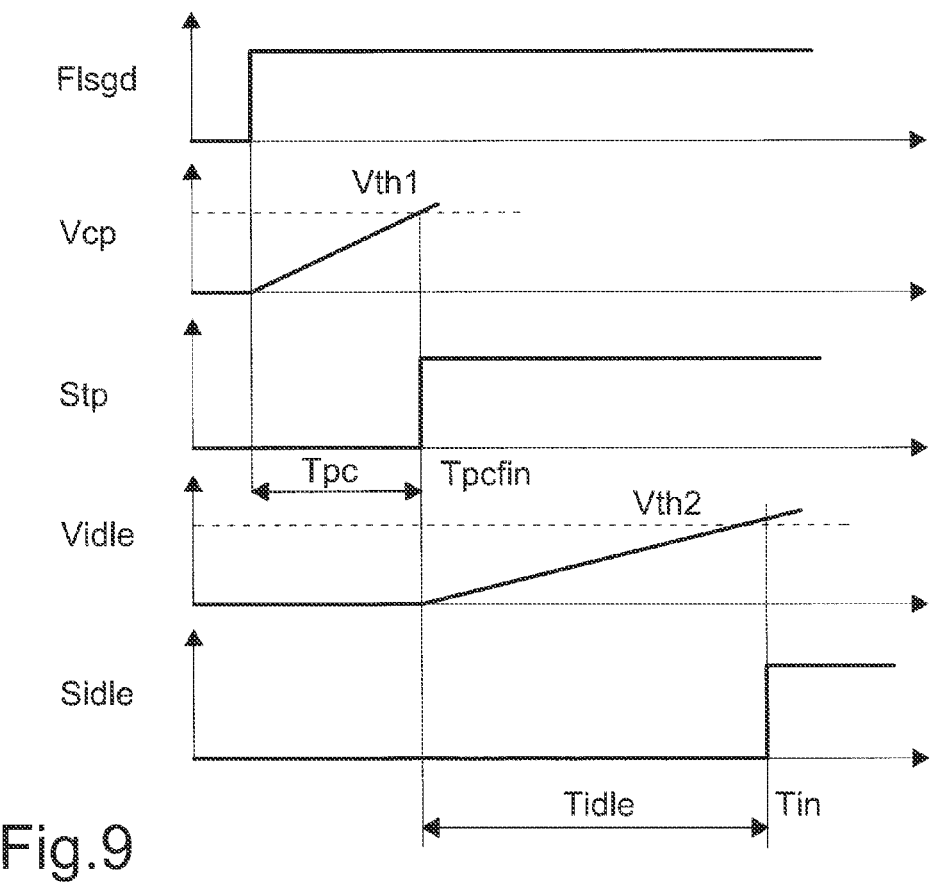
FIG. 9 shows time diagrams of certain voltages and currents involved in the circuit in FIG. 8.

FIG. 9 shows the time diagrams of the signals Flsgd, Vcp, Vidle, Stp and Sidle. The time periods Tpc and Tidle are the time periods for charging the respective capacitors Cpc and Cidle.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A control circuit, comprising:
a controller configured to turn on and turn off high-side and low-side transistors of a half-bridge circuit with a first and second output signal, respectively, the half-bridge circuit including a bootstrap capacitor coupled to a node between the high-side and low-side transistors, the controller configured to initially turn on the low-side transistor before the high-side transistor is turned on during a first switching cycle of the high-side and low-side transistors;
a first timer coupled to a first input of the controller and configured to provide a first control signal to the controller that initially turns on the low-side transistor for a duration given by a first time period to pre-charge the bootstrap capacitor during the first switching cycle;
a second timer coupled to a second input of the controller and configured to provide a second control signal to the controller that keeps the low-side transistor and the high-side transistor turned off over a second time period during the first switching cycle, the second time period immediately following the first time period and the second time period having a longer duration than the first time period; and
wherein the controller is further configured to turn the high-side and low-side transistors on and off independent of the first and second control signals during subsequent switching cycles of the high-side and low-side transistors.

2. The control circuit according to claim 1, wherein the second timer is configured to start the second time period from a final instant of the first time period.

3. The control circuit according to claim 1, wherein the second timer is configured to make the duration of the second time period long enough to stop any current oscillations, due to a first capacitor coupled to a primary winding of a transformer, from injecting current into intrinsic body diodes of the transistors of the half-bridge circuit and short enough to prevent the bootstrap capacitor from being discharged to compromise correct driving of the high-side transistor.

4. The control circuit according to claim 1, wherein the second timer includes a first timing capacitor and a first charging circuit configured to charge the first timing capacitor to a reference voltage, the first timing capacitor having a charging time period equal to the second time period.

5. The control circuit according to claim 1, wherein:
the first timer includes a first timing capacitor, a first charging circuit configured to charge the first timing capacitor, and a first threshold comparator configured to compare a voltage of the first timing capacitor to a first threshold and provide a first stop signal to the controller based on relative values of the voltage of the first timing capacitor and the first threshold;
the second timer includes a second timing capacitor, a second charging circuit configured to charge the second timing capacitor in response to the first stop signal, and a second threshold comparator configured to compare a voltage of the second timing capacitor to a second threshold and provide a second stop signal to the controller based on relative values of the voltage of the second timing capacitor and the second threshold; and
the controller is configured to end the first time period and start the second time period in response to the first stop signal and is configured to end the second time period in response to the second stop signal.

6. The control circuit according to claim 1, wherein the controller includes a set-reset flip-flop and a control logic circuit configured to provide set and reset signals to set and reset inputs, respectively, of the flip-flop according to the first and second time periods, respectively.

7. A method, comprising:
controlling a switching circuit of a resonant converter, the switching circuit including a half-bridge circuit having a high-side transistor and a low-side transistor, and the converter including a transformer with a primary winding coupled to a middle point of the half-bridge circuit and a secondary winding coupled to a load, the controlling including:
turning on the low-side transistor before turning on the high-side transistor during an initial switching cycle of the low-side and high-side transistors and for a duration given by a first time period sufficient to pre-charge a bootstrap capacitor coupled with the middle point of the half-bridge; and
turning off the low-side transistor and the high-side transistor for a second time period during the initial switching cycle, the second time period immediately following the first time period and having a longer duration than the first time period; and
turning the high-side and low-side transistors on and off through the first and second controlling signals from the controller independent of the first and second timing signals during subsequent switching cycles to thereby apply a square-wave voltage to the primary winding of the transformer.

8. The method according to claim 7, wherein turning off the low-side transistor and the high-side transistor for the second time period includes starting the second time period from a final instant of the first time period.

9. The method according to claim 7, wherein turning off the low-side transistor and the high-side transistor for the second time period includes setting the duration of the second time period long enough to stop any current oscillations, due to a first capacitor coupled to the primary winding of the transformer, from injecting current into intrinsic body diodes of the transistors of the half-bridge and short enough to prevent the bootstrap capacitor from being discharged to compromise correct driving of the high-side transistor.

10. A switching converter, comprising:
a switching circuit that includes a half-bridge circuit having a high-side and a low-side transistor coupled to each other at an intermediate node;
a bootstrap capacitor coupled to the intermediate node; and
a control circuit configured to control the switching circuit, the control circuit including:
a controller configured to turn on and turn off the high-side and low-side transistors with a first output signal and a second output signal, respectively, and the controller configured to turn on the low-side transistor before the high-side transistor is turned on during a first switching cycle of the high-side and low-side transistors;
a first timer coupled to a first input of the controller and configured to provide a first control signal to the controller that causes the low-side transistor to turn on first during the first switching cycle of the high-side and low-side transistors and for a duration given by a first time period to pre-charge the bootstrap capacitor;
a second timer coupled to a second input of the controller and configured to provide a second control signal to the controller that causes the low-side transistor and the high-side transistor to be turned off over a second time period during the first switching cycle, the second time period immediately following the first time period and the second time period having a longer duration than the first time period; and wherein the controller is further configured to generate the first and second output signals to turn on and turn off the high-side and low-side transistors during switching cycles of the high-side and low-side transistors, and to modify the first and second output signals responsive to the first and second control signals only during the first switching cycle of the high-side and low-side transistors.

11. The switching converter according to claim 10, wherein the second timer is configured to start the second time period from a final instant of the first time period.

12. The switching converter according to claim 10, wherein the second timer is configured to make the duration of the second time period long enough to stop any current oscillations, due to a first capacitor coupled to the primary winding of the transformer, from injecting current into intrinsic body diodes of the transistors of the half-bridge and short enough to prevent the bootstrap capacitor from being discharged to compromise correct driving of the high-side transistor.

13. The switching converter according to claim 10, wherein the second timer includes a first timing capacitor and a first charging circuit configured to charge the first timing capacitor up to a reference voltage, the first timing capacitor having a charging time period equal to the second time period.

14. The switching converter according to claim 10, wherein:
the first timer includes a first timing capacitor, a first charging circuit configured to charge the first timing capacitor, and a first threshold comparator configured to compare a voltage of the first timing capacitor to a first threshold and provide a first stop signal to the controller based on relative values of the voltage of the first timing capacitor and the first threshold;

the second timer includes a second timing capacitor, a second charging circuit configured to charge the second timing capacitor in response to the first stop signal, and a second threshold comparator configured to compare a voltage of the second timing capacitor to a second threshold and provide a second stop signal to the controller based on relative values of the voltage of the second timing capacitor and the second threshold; and the controller is configured to end the first time period and start the second time period in response to the first stop signal and is configured to end the second time period in response to the second stop signal.

15. The switching converter according to claim 10, wherein the bootstrap capacitor has first and second terminals, the first terminal being coupled to the intermediate node, the switching converter further comprising a supply circuit coupled to the second terminal of the bootstrap capacitor and configured to charge the bootstrap capacitor, the supply circuit including a bootstrap diode.

16. The switching converter of claim 10 further comprising a transformer with a primary winding coupled to the intermediate node of the half-bridge and a secondary winding configured to be coupled with a load.

17. The switching converter of claim 10, wherein the control circuit is formed in an integrated circuit including a semiconductor material chip.

18. The switching converter of claim 10, wherein the switching converter comprises an LLC type resonant converter.

19. The switching converter of claim 10, wherein the switching converter comprises a DC-DC resonant converter.

* * * * *